United States Patent [19]

Backlin

[11] 4,427,202

[45] Jan. 24, 1984

[54] COMBINATION STATIC OIL SEAL AND ROTARY DUST SEAL

[75] Inventor: Robert R. Backlin, Crete, Ill.

[73] Assignee: Allis-Chalmers Corporation, Milwaukee, Wis.

[21] Appl. No.: 412,829

[22] Filed: Aug. 30, 1982

[51] Int. Cl.³ .......................... F16J 15/32; F16J 15/38
[52] U.S. Cl. ....................................... 277/68; 277/65; 277/85; 277/95; 277/153
[58] Field of Search ..................... 277/13, 14 R, 14 V, 277/25, 65, 67–69, 85, 95, 152, 153

[56] References Cited

U.S. PATENT DOCUMENTS

| | | | |
|---|---|---|---|
| 2,868,567 | 1/1959 | Kindig | 277/95 X |
| 3,072,413 | 1/1963 | Parks | 277/153 X |
| 3,363,911 | 1/1968 | McKinven | 277/153 X |

FOREIGN PATENT DOCUMENTS

| | | | |
|---|---|---|---|
| 940953 | 3/1956 | Fed. Rep. of Germany | 277/153 |
| 54-145851 | 11/1979 | Japan | 277/153 |
| 2058960 | 4/1981 | United Kingdom | 277/153 |

*Primary Examiner*—Robert S. Ward
*Attorney, Agent, or Firm*—Arthur L. Nelson

[57] ABSTRACT

A combination seal for a rotating member having a stationary oil seal mounted on a housing and a rotating dust seal carried on a rotating member together with a slinger to throw off dust particles.

10 Claims, 2 Drawing Figures

COMBINATION STATIC OIL SEAL AND ROTARY DUST SEAL

This invention relates to a seal and, more particularly, to a combination oil seal mounted on a stationary housing and a dust seal carried with a dust slinger on a rotating member. An optional feature is using a labyrinth seal with the slinger to form a shield forming a chamber which may be pressurized with clean air.

During normal operation of an engine, a seal is used at the rear of the engine between the housing and the rotating crankshaft, wear sleeve or flywheel, depending on the specific structure. The seal prevents oil from escaping from the engine and keeps dirt, water or other foreign material from entering the engine. Seal failure is often due to abrasion by dust and dirt entering the seal and causing the seal to wear away. Accordingly, the applicant's invention provides for an oil seal to seal the engine and a dust seal which keeps dust or dirt from getting to the oil seal which could cause premature failure.

U.S. Pat. No. 3,341,264 shows a dual lip seal. An oil lip and a dust lip engage an axial surface of a wear sleeve. The applicant has provided for a static oil lip for engaging a cylindrical surface such as the crankshaft and a rotating dust seal on the crankshaft or flywheel engaging a radial surface of the static seal casing. A dust slinger seal forms a radial flange and shields the dust seal and keeps the chamber formed by the slinger seal relatively clean. A labyrinth seal formed in the engine housing with the slinger improves the sealing quality of the dust slinger and supplying clean pressurized air in the chamber formed by the dust slinger further improves the cleanliness of the dust seal.

It is an object of this invention to provide a combination of a static oil seal engaging a rotating member and a rotating dust seal engaging a portion of a static member.

It is another object of this invention to provide a stationary oil seal on the engine housing engaging a rotating member such as a crankshaft and a rotating dust seal on the crankshaft engaging a radial facing of the stationary member and a dust slinger to improve the cleanliness of the seal assembly.

It is a further object of this invention to provide a combination stationary oil seal on the housing and a rotating dust seal on the crankshaft engaging a radial stationary surface with a dust slinger enclosing the dust seal to form a chamber. The dust slinger operates within an annular recess of the housing to form a labyrinth seal. Clean, pressurized air may be supplied to the chamber improving the cleanliness of the environment of the dust seal.

The objects of this invention are accomplished in a seal assembly and for the purpose of illustration, a seal used on an engine will be described. An oil seal is mounted on the housing and engages the crankshaft of the engine. The crankshaft carries a dust seal with the seal engaging a radial surface on the oil seal casing and a slinger is carried on the crankshaft which shields the dust seal and has an axial flange received in an annular recess of the housing to define a labyrinth seal. This is to assure cleaner operating conditions for the dust seal. Under dustier operating conditions, clean pressurized air can be supplied in the chamber under the dust shield to prevent dust from entering and causing failure of the dust seal.

Referring to the drawings, the preferred embodiment of this invention is illustrated.

Figure 1:
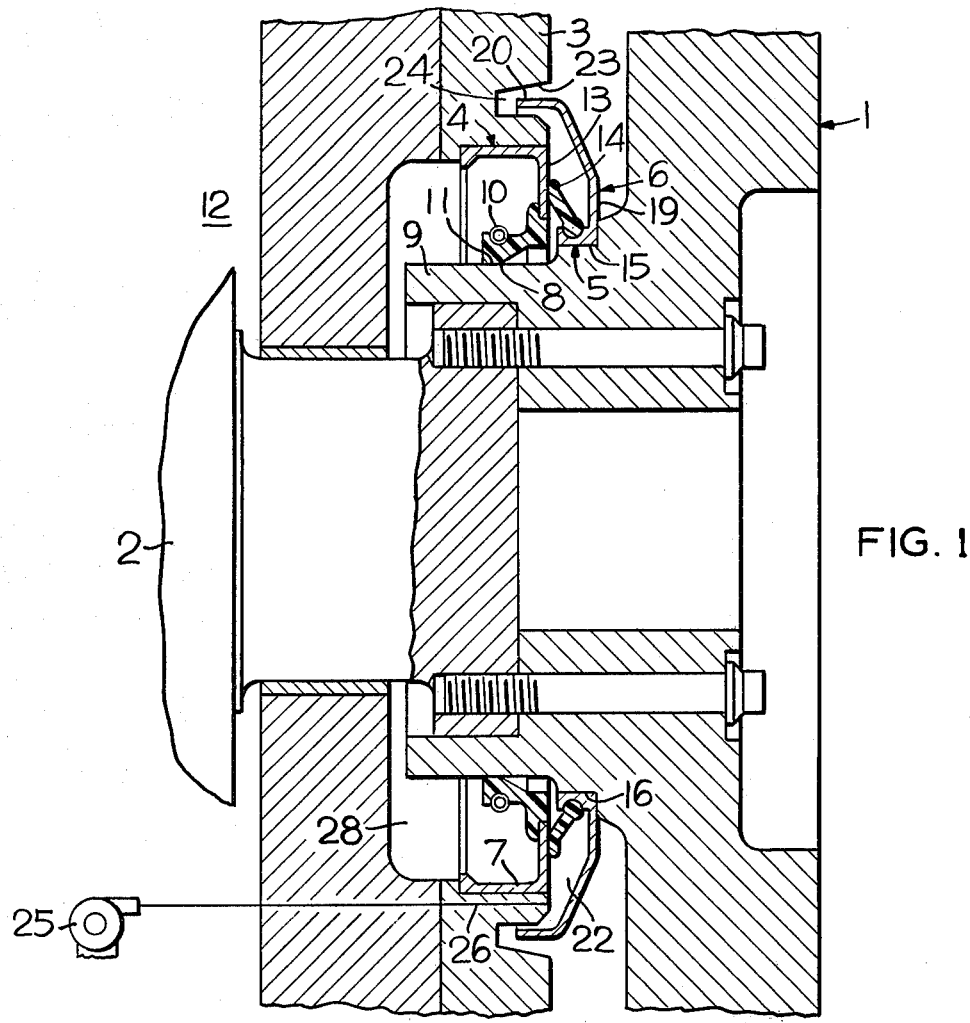
FIG. 1 illustrates a cross-section view of a portion of an internal combustion engine with the seal assembly mounted at the rear of the crankshaft.
Figure 2:
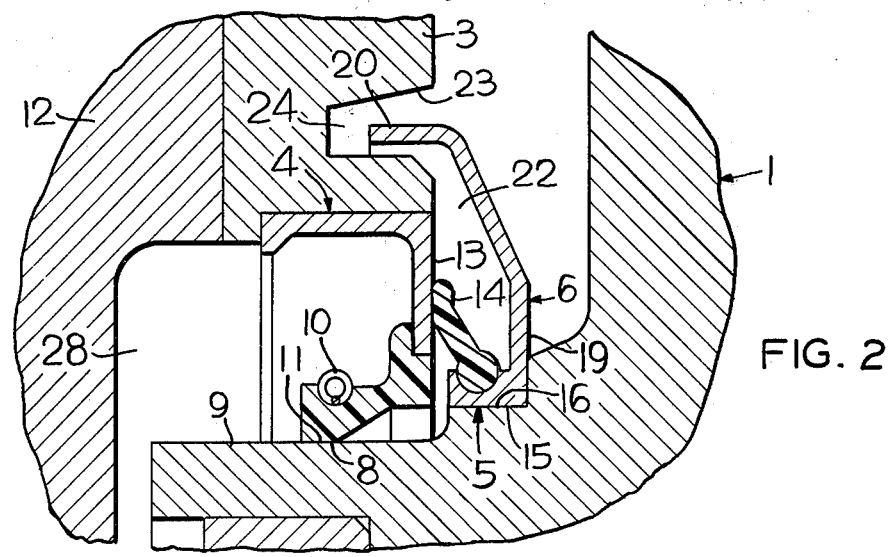
FIG. 2 is an enlarged cross-section view showing the specific details of the seal.

FIG. 1 illustrates a flywheel 1 fastened to a crankshaft 2 by a suitable means. The flywheel 1 is on the external side of the housing 3. The housing 3 carries the static seal 4 while the flywheel carries the rotating seal 5 and the slinger 6. The static seal 4 includes a casing 7 housing the oil lip 8 of the seal which bears against an axial flange 9 of the flywheel 1. Suitable resilient means 10 constantly biases the oil lip 8 in sealing engagement with the peripheral surface 11 of the flywheel 1. The seal prevents oil from escaping from the engine 12.

The flywheel 1 carries the rotating dust seal 5 which has a lip 14 bearing against the radial surface 13 of the casing 7. The dust seal 5 is formed with a casing 15 seated on an annular flange 16 of the flywheel 1.

A slinger 6 is integral with the casing 15 of the dust seal 5 and forms a radial flange 19 and an axial flange 20. The slinger 6 normally throws off foreign material by centrifugal force which prevents the dust or foreign material from ever entering the chamber 22 formed by the slinger. This provides a relatively clean environment for the dust seal lip 14.

To improve its operation, however, the axial flange 20 operates in an annular recess 23 of the housing 3. A labyrinth seal 24 is formed by the rotation of the axial flange 20 in the annular recess 23. This seal will improve engine operation under unusually dirty conditions. A further refinement of the labyrinth seal is to supply clean pressurized air in the chamber. Pressurized air could be supplied from a supercharger 25 on the engine in which the compressor may be driven by the engine or engine exhaust. Clean, pressurized air normally supplied by a supercharger is filtered and pressurized before it is supplied to the combustion chambers of an engine. A bleed passage from the air supplied to the engine could be supplied to the chamber 22 through passage 26 in the housing 3.

The operation of the seal and the modifications thereof will be described as follows:

The static seal 4 is an oil seal mounted in the housing 3. The seal has a resilient means to press the lip 8 against the cylindrical surface 11 to form an oil seal preventing escape of oil from the cavity 28 within the engine 12.

The dynamic or rotating seal 5 is a dust seal and is carried on the axial flange 16 of the flywheel 1. The lip 14 is biased against the radial surface 13 of the seal casing 7. The lip seal 14 rotates and so foreign material which may be deposited on the lip seal 14 tends to be thrown off before it is allowed to enter the engine. A further refinement of the combination seal is the slinger 6 which is also mounted on the shoulder or cylindrical surface 16 and extends radially outward. The slinger 6 being a rotating member tends to throw off foreign material as it rotates with the flywheel. Since the axial flange 20 is received in annular recess 23, it forms a labyrinth seal 24 which further tends to prevent dirt from entering the seal chamber 22. This improves the cleanliness of the environment around the dust seal 5 in normal operating condition. By applying pressurized clean air within the chamber 22, impurities of foreign material is generally prevented from entering through the labyrinth seal and into the chamber 22 because of the pressurized air and the rotating slinger 6. This provides a clean operating condition for the combination seal assembly even though they may be operating under adverse conditions. While the description of this invention shows a combination seal mounted on the housing and flywheel, the rotating member may also be a crankshaft or a wear sleeve mounted on the crankshaft or the flywheel. The operation would be essentially the same with any stationary member and any rotating member in which the opening between the two members is sealed from the escape of oil in one direction and from dirt, dust and other foreign material from entering the cavity through the opening between the two members.

The embodiments of the invention in which an exclusive property or privilege is claimed are defined as follows:

1. A combination oil seal and dust seal assembly comprising, a stationary means, a rotating member, an oil seal mounted on said stationary means engaging said rotating member, a dust seal carried on said rotating member and engaging said stationary means, a dust slinger carried on said rotating member shielding said dust seal and thereby providing a combination seal assembly between said stationary means and said rotating member.

2. A combination oil seal and dust seal assembly as set forth in claim 1 wherein said slinger defines a radial and axial flange extending from its support on said rotating member to shield said dust seal.

3. A combination oil seal and dust seal assembly as set forth in claim 1 including means defining an annular recess in said stationary means, said slinger defines an axial supporting structure on said rotating member, a radial flange from said supporting structure and an axial flange for reception in said annular recess to form a labyrinth seal structure.

4. A combination oil seal and dust seal assembly as set forth in claim 1 wherein said oil seal defines a casing forming a radial facing, said rotating seal defines a lip biased for engaging said radial facing on said oil seal casing.

5. A combination oil seal and dust seal assembly as set forth in claim 1 wherein said stationary means defines an annular recess, said slinger defines a radial and an axial flange and said axial flange is received in said annular recess to form a labyrinth seal, and slinger defines an enclosure around said dust seal, means for supplying clean air to said enclosure to thereby provide a clean environment for said rotating dust seal.

6. A combination oil seal and dust seal assembly as set forth in claim 1 wherein said stationary means includes an engine housing, said rotating member includes an engine flywheel.

7. A combination oil seal and dust seal assembly as set forth in claim 1 wherein said stationary means includes an engine housing, said rotating member includes an engine crankshaft.

8. A combination oil seal and dust seal assembly as set forth in claim 1 wherein said oil seal engages an axial surface on said rotating member, said dust seal engages a radial surface on said stationary means.

9. A combination oil seal and dust seal assembly as set forth in claim 1 wherein said dust seal and said slinger define an integral combination with each forming a radial flange.

10. A combination oil seal and dust seal assembly as set forth in claim 1 wherein said oil seal defines a rubber lip engaging an axial surface on said rotating member, said dust seal defines a radial lip engaging a radial surface on said stationary means, said slinger defines a metal flange fielding said oil seal.

* * * * *